(12) United States Patent
Kotipalli et al.

(10) Patent No.: US 11,405,474 B2
(45) Date of Patent: Aug. 2, 2022

(54) ABSTRACTING GEOGRAPHIC LOCATION TO A SQUARE BLOCK OF PRE-DEFINED SIZE

(71) Applicant: Microsoft Technology Licensing, LLC, Redmond, WA (US)

(72) Inventors: Srinivasachakrapani Kotipalli, Sammamish, WA (US); Parul Manek, Redmond, WA (US); Konstantin E. Ryvkin, Bellevue, WA (US); Brad Rutkowski, Redmond, WA (US); Gregory Irving Thiel, Black Diamond, WA (US); Ayla Kol, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/672,104

(22) Filed: Nov. 1, 2019

(65) Prior Publication Data

US 2021/0136161 A1  May 6, 2021

(51) Int. Cl.
*H04L 67/52* (2022.01)
*G06F 16/29* (2019.01)
*H04L 43/08* (2022.01)
*H04L 67/10* (2022.01)

(52) U.S. Cl.
CPC .............. *H04L 67/18* (2013.01); *G06F 16/29* (2019.01); *H04L 43/08* (2013.01); *H04L 67/10* (2013.01)

(58) Field of Classification Search
CPC ......... H04L 67/18; H04L 43/08; H04L 67/10; G06F 16/29

USPC ........................................................ 709/217
See application file for complete search history.

(56) References Cited

U.S. PATENT DOCUMENTS

| | | | |
|---|---|---|---|
| 5,737,731 A | 4/1998 | Lester et al. | |
| 6,308,273 B1 * | 10/2001 | Goertzel | G06F 21/6218 726/2 |
| 7,606,687 B2 | 10/2009 | Galbreath et al. | |
| 8,112,100 B2 * | 2/2012 | Frank | H04W 4/029 455/456.4 |
| 8,897,817 B1 | 11/2014 | Jackson et al. | |
| 10,387,677 B2 | 3/2019 | Chakraborty et al. | |

(Continued)

FOREIGN PATENT DOCUMENTS

| | | | | |
|---|---|---|---|---|
| CN | 106533680 A | | 3/2017 | |
| CN | 107924553 A | * | 4/2018 | ......... G06F 16/9537 |

OTHER PUBLICATIONS

Davis P. Stern, "Latitude and Longitude History", Aug. 29, 2004. (Year: 2004).*

(Continued)

*Primary Examiner* — Umar Cheema
*Assistant Examiner* — John Fan
(74) *Attorney, Agent, or Firm* — Christopher J. Volkmann; Kelly, Holt & Christenson, PLLC

(57) ABSTRACT

A client-side system detects a current location of a client device and a cloud interaction metric. The geographic area around the location of the client device is divided into grid sections. The client-side system identifies a pre-defined reference location corresponding to the grid section that the client device location resides in. The pre-defined reference location, corresponding to that grid section, and the cloud interaction metric are provided to a remote server computing system.

18 Claims, 11 Drawing Sheets

(56) References Cited

U.S. PATENT DOCUMENTS

| | | | | |
|---|---|---|---|---|
| 2004/0098236 | A1* | 5/2004 | Mayer | G06T 17/05 |
| | | | | 703/2 |
| 2013/0171970 | A1 | 7/2013 | Naiki et al. | |
| 2013/0281063 | A1 | 10/2013 | Jactat et al. | |
| 2013/0325856 | A1 | 12/2013 | Soto Matamala et al. | |
| 2015/0134823 | A1* | 5/2015 | Cucinotta | H04L 47/2425 |
| | | | | 709/226 |
| 2016/0364409 | A1* | 12/2016 | Memon | G06F 16/9537 |
| 2019/0342228 | A1* | 11/2019 | Varma | H04L 47/70 |

OTHER PUBLICATIONS

Martin F. https://gis.stackexchange.com/revisions/142327/4 (Year: 2015).*

"Latilude/Longitude Distance Calculator", Retrieved from: https://www.nhc.noaa.gov/gccalc.shtml. Retrieved Date Sep. 18, 2019, 2 Pages.

"Location privacy". Retrieved from: https://publiclab.org/wiki/location-privacy, Retrieved Date: Sep. 23, 2019, 9 Pages.

Andres, et al., "Geo-Indistingushablity: Differential Privacy for Location-Based Systems", In Proceedings of the ACM SIGSAC conference on Computer & Communications Security, Nov. 4, 2013, 15 Pages.

Brush, et al., "Exploring End User Preferences for Location Obfuscation, Location-Based Services, and the Value of Location", In Proceedings of the 12th ACM international conference on Ubiquitous computing, Sep. 26, 2010, pp. 95-104.

Chow, Chi-Yin, "Spatial Cloaking Algorithms for Location Privacy", Retrieved from: https://pdfs.semanticscholar.org/826f/1a6849f9c583c54f58aa986ba055386887dc.pdf. May 24, 2016, 9 Pages.

Cui, Winnie, "Project PrvTree: Blurring your "where" for location privacy", Retrieved from: https://www.microsoft.com/en-us/research/blog/project-privtree-blurring-location-privacy/, Jan. 20, 2017, 11 Pages.

"International Search Report and Written Opinion Issued in PCT Application No. PCT/US20/056224", dated Feb. 1, 2021, 13 Pages.

* cited by examiner

ABSTRACTING GEOGRAPHIC LOCATION TO A SQUARE BLOCK OF PRE-DEFINED SIZE

BACKGROUND

Computing systems are currently in wide use. Some computing systems host services or other applications that are accessed by client devices.

In order for users to access a cloud service, the user device (sometimes a mobile device) needs to have connectivity to a wide area network (such as the Internet). In order for a user to have connectivity to an enterprise application, over a wide area network, the enterprise's internal network is made available at a point of Internet egress. Many enterprises currently provide Internet egress points at a few different locations, because of the protections that are needed to maintain security and integrity.

It can be beneficial for the cloud service to measure metrics corresponding to the enterprise, so the cloud service can determine how the internal network (or other characteristics) of the enterprise are impacting its cloud experience. The cloud service can then provide information to the enterprise indicative of how to improve its cloud experience. Also, the metrics that are measured may be less useful to the cloud service if they do not also include a user location identifying where the metric was measured. Without user location, the metric has less context by which to be evaluated.

The discussion above is merely provided for general background information and is not intended to be used as an aid in determining the scope of the claimed subject matter.

SUMMARY

A client-side system detects a current location of a client device and a cloud interaction metric. The geographic area around the location of the client device is divided into grid sections. The client-side system identifies a pre-defined reference location corresponding to the grid section that the client device location resides in. The pre-defined reference location, corresponding to that grid section, and the cloud interaction metric are provided to a remote server computing system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, it can be helpful in many different scenarios to know the geographic location of the users of a cloud service or another application that provides client access to a remote server environment. However, many regions have privacy regulations that govern what type of user location data can be obtained and what can be done with it. Similarly, it may be difficult to get users to voluntarily disclose their location data. However, without any type of user location data, even when cloud interaction metrics are measured and obtained, it can be very difficult for a cloud service to understand and fix (or advise an enterprise how to fix) any connectivity issues. Therefore, it can be difficult to determine how to improve deployment of computing system resources, and how to improve the user experience.

It has been found, however, that some scenarios (such as connectivity design) do not need to obtain accurate, individual user location information. Instead, these types of systems can focus on groups of users, and a material approximation of location is adequate to make many decisions. Further, when an enterprise asserts connectivity designs across its organization (such as at branch offices), it can be important for the enterprise to understand the impact this has on the cloud experience encountered at the branch office.

The present description thus proceeds with respect to a client-based location system that generates an abstracted location, based upon an actual user location. The abstracted location provides a pre-defined reference location corresponding to a grid section that has a pre-defined area, and which includes the user's actual location.

Figure 1:
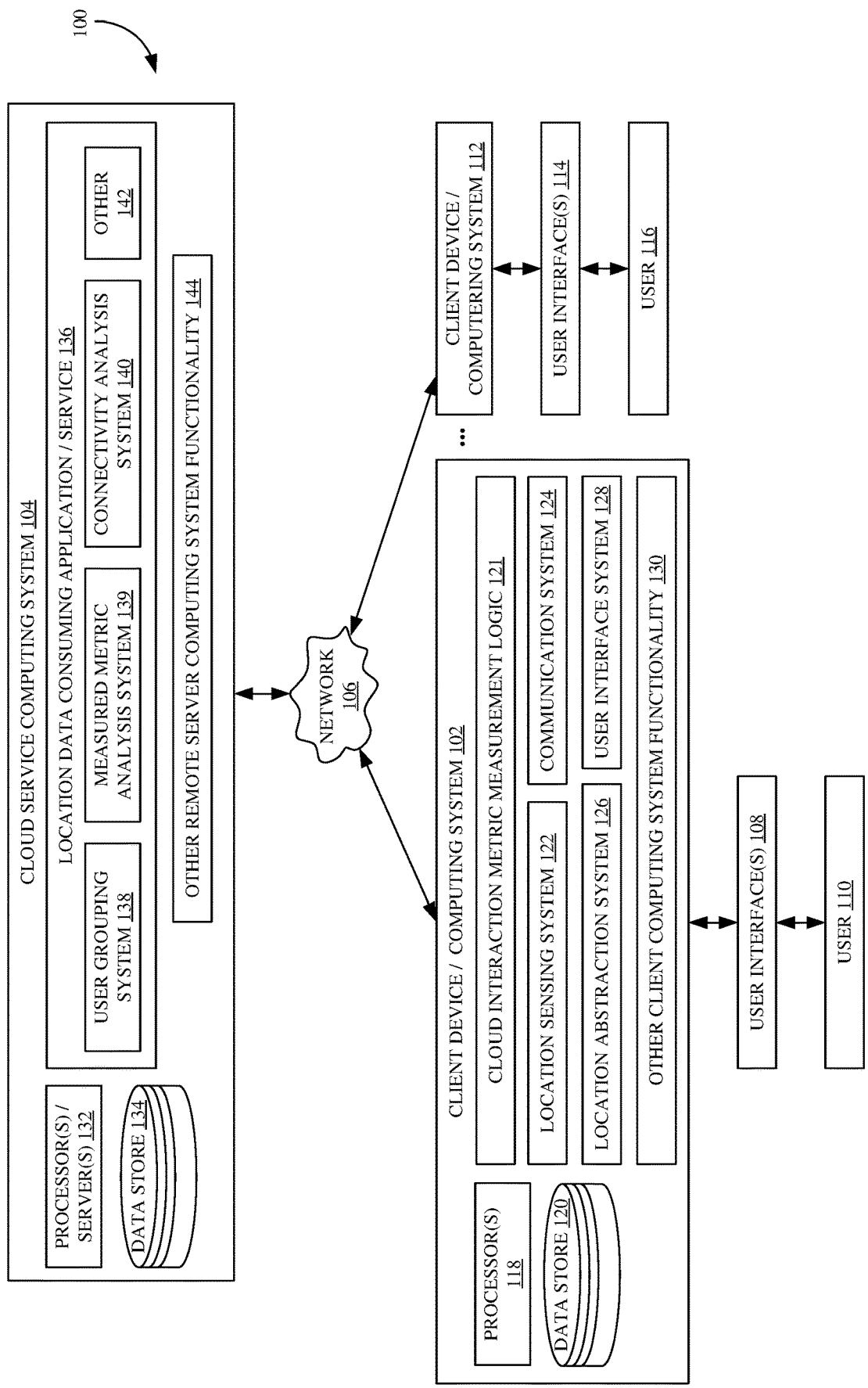
FIG. 1 is a block diagram of one example of a computing system architecture that uses location abstraction.

FIG. 1 is a block diagram of a computing system architecture 100. Architecture 100 shows a client device/computing system 102 accessing a cloud service computing system 104 over a network 106. Therefore, network 106 can be a wide area network, a local area network, a cellular network, a near field communication network, or any of a wide variety of other networks or combinations of networks.

FIG. 1 shows that, in one example, client device 102 generates user interfaces 108 for interaction by user 110. User 110 illustratively interacts with user interfaces 108 in order to control and manipulate client device/computing system 102 and some portions of cloud service computing system 104.

FIG. 1 also shows that one or more other client devices/computing systems 112 can generate user interfaces 114 for interaction by other users 116. Users 116 can thus interact with user interfaces 114 in order to control and manipulate client device/computing system 112, and some portions of remote server computing system 104.

It may be that cloud service computing system 104 runs one or more applications that receive, as an input, the location of the various client devices 102, 112 that are using it along with one or more cloud interaction metrics that are measured and are indicative of a cloud interaction characteristic of the client devices relative to the cloud service. The metric is illustratively one that is impacted by the location of the corresponding client device relative to the location of the cloud service computing system 104, when the metric was measured. Therefore, the present discussion proceeds with respect to client devices 102, 112 generating and providing abstracted location information, and a cloud interaction metric, to cloud service computing system 104. It will be noted that client devices 102, 112 can be similar or different. For purposes, of the present description, it will be assumed that they are similar so that only client device/computing system 102 is described in more detail.

Client device/computing system 102 (sometimes referred to herein as client device 102) illustratively includes one or more processors 118, data store 120, cloud interaction metric measurement logic 121, location sensing system 122, communication system 124, location abstraction system 126, user interface system 128, and it can include a wide variety of other client computing system functionality 130. Cloud service computing system 104 illustratively includes one or more processors or servers 132, one or more data stores 134, and location data consuming application 136 (which can, itself, include user grouping system 138, measured metric analysis system 139, connectivity analysis system 140, and other items 142). Cloud service computing system 104 can also include a wide variety of other remote server computing system functionality 144. Before describing the overall operation of architecture 100, a brief description of some of the items in architecture 100, and their operation, will first be provided.

Location data consuming application/service 136 can be any of a wide variety of different types of services or applications. In the example described herein, it can be an application or service that analyzes connectivity information in order to improve the remote server computing system 104, and in order to improve the experience of various users 110, 116 (which may be users at an enterprise or other organization) in using their client devices 102, 112 to connect to cloud service computing system 104. Thus, user grouping system 138 can group the users 110, 116 based upon their geographic location (or abstracted location). Measured metric analysis system 139 can perform any of a wide variety of different types of analysis on the measured metrics received from client devices 102, 112. Connectivity analysis system 140 can analyze any connectivity issues, such as load balancing issues, resource deployment and management issues, latency, among a wide variety of other things, based on the abstracted locations and analysis performed by system 139.

It will be noted that client device/computing system 102 can take a wide variety of different forms. It may be a mobile device, a desktop computer, or another device. It illustratively includes cloud interaction metric measurement logic 121 which can measure one or more different metrics that may characterize different aspects of the interaction between client device 102 and cloud service computing system 104, where the metric values vary based on, or depend in some way on, or are somehow to be corrected to, the location of the device 102 taking the measurement. Some examples of measured metrics are described in greater detail below. Client device 102 also illustratively includes a location sensing system 122 that senses a location of device 102. Location sensing system 122 can thus be a GPS receiver, a cellular triangulation system, a dead reckoning system, or any of a wide variety of other systems that can generate a geographic location signal indicative of a sensed geographic location of device 102 in a local or global coordinate system. Location abstraction system 126 illustratively abstracts the location provided by location sensing system 122. It does so by obtaining a set of grid sections that the geographic area around device 102 is divided into. It identifies which grid section device 102 is included in, and then picks a pre-defined reference location, corresponding to that grid section, as the abstract location of device 102. The precise location of device 102 is thus abstracted to a geographic area the size of the grid section. The pre-defined reference location for the grid section may be the center of the grid section, one of the corners of the grid section, etc.

Communication system 124 is configured to facilitate the communication of client device/computing system 102 with cloud service computing system 104 over network 106. Therefore, communication system 124 may vary, depending on the type of communication it is to facilitate. The communication may involve a network that provides multiple different paths between systems 102 and 104.

User interface system 128 illustratively generates user interfaces 108 and detects user interaction with those interfaces. It can provide an indication of the user interaction with interfaces 108 to other items in client device/computing system 102, and possibly to cloud service computing system 104.

Figure 2A:
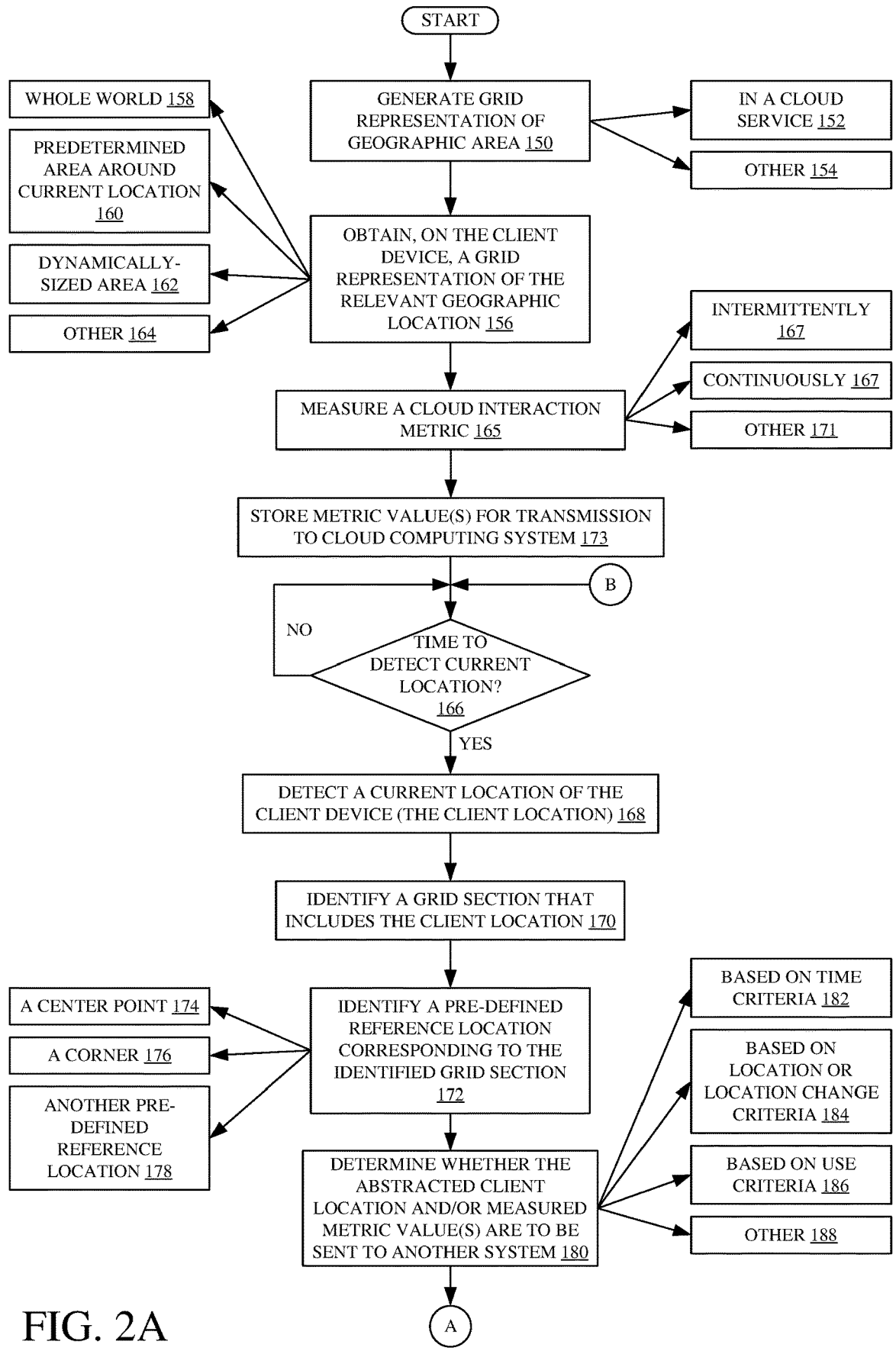
FIGS. 2A and 2B (collectively referred to herein as FIG. 2) show a flow diagram illustrating one example of the operation of the architecture illustrated in FIG. 1, in generating an abstract location of the client device.
Figure 2B:
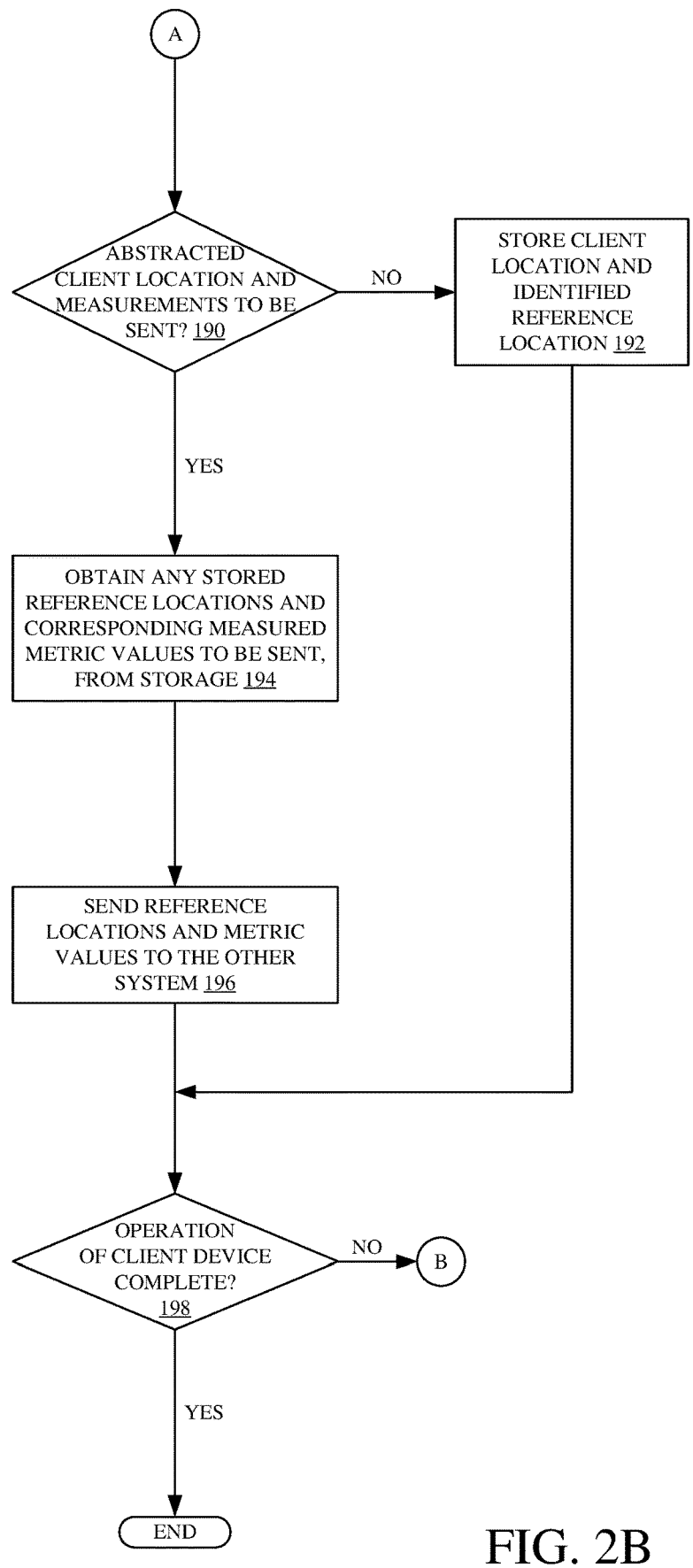

FIGS. 2A and 2B (collectively referred to herein as FIG. 2) show a flow diagram illustrating one example of the operation of client device/computing system 102 in generating and sending a cloud interaction metric and abstract location information to cloud service computing system 104. It is first assumed that cloud service computing system 104 (or another remote system) or client device/computing system 102, generates a grid representation of a geographic area around client device/computing system 102. This is indicated by block 150 in the flow diagram of FIG. 2. The grid representation illustratively divides the geographic area around device 102 into a set of grid sections of a predefined size. Generating it in a cloud service is indicated by block 152, and generating it in other ways is indicated by block 154. One way of generating the grid representation of the geographic area is described in greater detail below with respect to FIG. 3.

The grid representation of the geographic area is obtained by location abstraction system 126, on client device/computing system 102. This is indicated by block 152 in the flow diagram of FIG. 2. The grid representation can be obtained for the entire world 158. It can be obtained for a predetermined, relevant area around the current location of client device/computing system 102, as indicated by block 160. Or it can be obtained for a dynamically sized area, based on sizing criteria, as indicated by block 162. For instance, if the location of client device/computing system 102 is relatively static, then a grid representation of a relevant geographic area around that location, having a pre-defined size may be obtained. However, if the location of the client device/computing system 102 is changing relatively rapidly (such as if user 110 is carrying it on an airplane, or otherwise), then the geographic area around device 102, for which the grid representation is obtained, may be enlarged to encompass a wider area. The grid representation can be obtained on the client device/computing system 102 in other ways as well, and this is indicated by block 164. Once obtained, device 102 has a geographic area around it that is divided into grid sections of equal size.

Cloud interaction metric measurement logic 121 can measure cloud interaction metrics in different ways. The metrics can include such things as latency encountered from the location of client device 102 to the location of the networking entry point to the service provided by cloud service computing system 104. The metric can be the throughput of a file download on the client device 102 from the networking entry point to the could-based service. The metric can be a simulated call experience on client device 102 from the networking entry point to the cloud-based service. These are just examples.

Cloud interaction measurement logic 121 can measure metric values, as indicated by block 165. They can be measured intermittently, as indicated by block 167, substantially continuously, as indicated by block 169, or in other ways, as indicated by block 169. Logic 121 then stores the measured metric values in data store 120 for transmission to cloud service computing system 104. Storing the metric values is indicated by block 173 in FIG. 2.

At some point, location sensing system 122 will generate a location signal indicative of a sensed, current location of client device/computing system 102. It may do this intermittently, periodically, or based on other criteria. For instance, if the location of client device/computing system 102 is relatively static, then location sensing system 122 may generate a location signal relatively infrequently. However, if the location of device/computing system 102 is changing rapidly, then location sensing system 122 may generate location signals indicative of its location more frequently, or substantially continuously (e.g., on near real-time). Determining whether location sensing system 122 should generate a location signal indicative of a current location of client device/computing system 102 is indicated by block 166 in the flow diagram of FIG. 2.

When it is time, location sensing signal 122 detects a current location (e.g., longitude/latitude coordinates) of the client device/computing system 102. This can be referred to as the "client location" and is indicated by block 168 in the flow diagram of FIG. 2. Location abstraction system 126 receives the client location and identifies a grid section (in the grid representation) that includes the client location, and then identifies a predetermined reference location corresponding to that grid section. Identifying the grid section is indicated by block 170 and identifying the reference location for that grid section is indicated by block 172. In one example, steps 170 and 172 are performed together. A more detailed example of this is illustrated and discussed below with respect to FIG. 4 and Table 1.

As briefly mentioned above, the pre-defined reference location corresponding to the identified grid section that includes the client location may be the center point of that grid section, as indicated by block 174. It may be a pre-defined one of the corners of that grid section, as indicated by block 176. It may be another pre-defined reference location corresponding to that grid section, and this is indicated by block 178. System 126 can store the abstract location, along with the actual location provided by location sensing system 122, in data store 120 for later analysis or transmission to cloud service computing system 104, or it can use communication 124 to communicate the abstract location and measured metric values to remote server computing system 124 immediately after it is identified.

Determining whether the abstracted client location and measured metric values are to be sent to another system (such as cloud service computing system 104) is indicated by block 180 in the flow diagram of FIG. 2. This determination can be based on time criteria as indicated by block 182. For instance, communication system 124 can transmit the abstract location of client device/computing system 102 intermittently or periodically. The determination can be based on the location of client device/computing system 102, or it can be based on a determination of whether the location of client device/computing system 102 has changed. For instance, it may be that communication system 124 only transmits a new abstract location of client device/computing system 102 to cloud service computing system 104, if that abstract location has changed since it was last sent. Sending the abstract location based on the location or a location change is indicted by block 184 in the flow diagram of FIG. 2.

Communication system 124 can send the abstract location and measured metric values based upon use criteria. For instance, if client device/computing system 102 is frequently accessing cloud service computing system 104, then its abstract location may be sent to remote server computing system 104 more often. Determining whether to send the abstract location based on use criteria is indicated by block 186 in the flow diagram of FIG. 2.

Determining whether to send the abstract client location and measured metric values can be based on other criteria as well. This is indicated by block 188 in the flow diagram of FIG. 2.

If the abstract client location (or the measured metric values) are not to be sent to remote server computing system 104 yet, as indicated by block 190, then location abstraction system 126 stores the abstract client location in data store 120 so that it can be sent later. Location sensing system 122 can also store the actual client location as well. Storing the client location and the identified reference location (or abstract location) is indicated by block 192.

If, at block 190, it is determined that the abstract location is to be sent to cloud service computing system 104, then communication system 124 obtains any stored reference locations (or abstract locations) that have not yet been sent to remote server computing system 104 from storage and which have corresponding, stored metric measurements. This is indicated by block 194. It then sends those reference locations (or abstract locations) and metric measurements to remote server computing system 104. This is indicated by block 196. This process can continue, until operation of the client device 102 is completed. This is indicated by block 198.

It should be noted that cloud service computing system 104 does not need to track the location of device 102, but only to report the abstract location of device 102 when a measurement of a cloud interaction metric is made, so that the measurement can be related to the location of device 102 when the measurement was taken.

Figure 3:
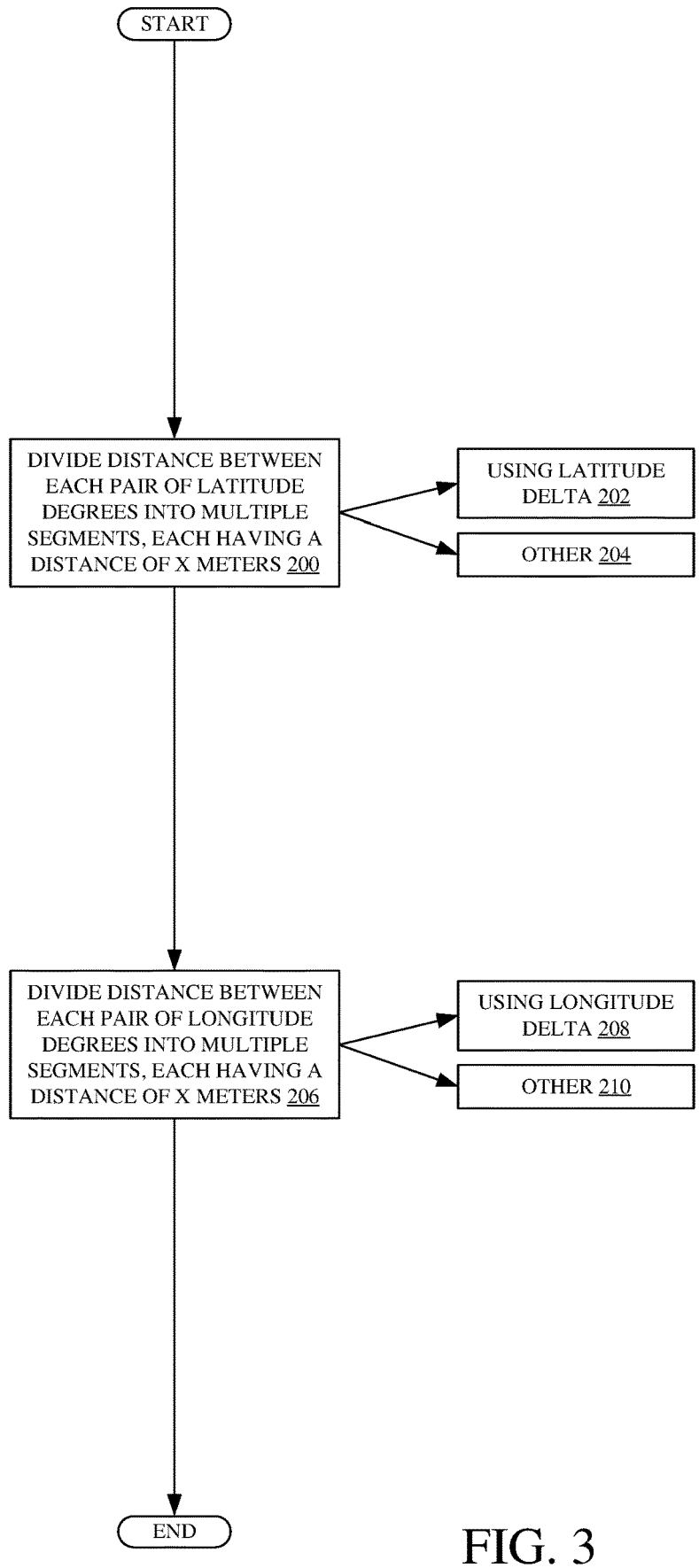
FIG. 3 is a flow diagram illustrating one example of how a relevant geographic area is divided into grid sections of a predetermined size.

FIG. 3 is a flow diagram illustrating one example of how a geographic region on earth can be divided into segments, each having a pre-defined area. It will first be noted that the distance between two longitudinal degrees, at any latitude, changes depending on the latitude angle according to the following equation:

$$\text{Distance between two Longitude Degrees at any Latitude} = \text{COS}(\text{Latitude Angle}) \cdot (\text{Distance between two longitude Degrees at equator}) \quad \text{EQ. 1}$$

From Equation 1 above, it can be seen that the distance corresponding to a one degree change in longitude at the equator is 111 kilometers.

Assume, for the sake of example, that the grid sections discussed herein are to be square grid sections where each side measures 300 meters. In that case, the longitude variation at any latitude (Lat D), over 300 meters is as follows:

$$300/111 \cdot 1000 \cdot \text{COS}(\text{Lat } D) \quad \text{EQ. 2}$$

This is referred to as the longitude delta.

Unlike longitude, the difference between two degrees of latitude does not change at different longitudes. Instead, the distance over the surface of the earth covered by a change of one latitude degree is given as follows:

$$\text{Length between two latitude degrees} = 136,000 \text{ meters, then } x \text{ meters will have delta} = x/136000 \quad \text{EQ. 3}$$

For x=300 m, latitude delta=300/136000=0.0022

This is will be referred to as latitude delta.

Referring again to FIG. 3, in order to obtain grid segments for a relevant geographic region, the distance between each pair of latitude degrees is first divided into multiple segments, each having a distance of x meters (where x is the desired length of one side of the grid segment or grid section). This is indicated by block 200 in the flow diagram of FIG. 3. This can be done, as discussed above, using the latitude delta measure. This is indicated by block 292. It can be done in other ways as well, as indicated by block 204.

Next, the distance between each pair of longitude degrees in the relevant area is divided into multiple segments each having a distance of x meters (where x, again, is the length of the sides of the grid sections or grid segments). This is indicated by block 206. This can be done using the longitude delta measure, discussed above. This is indicated by block 208. It can be done in other ways as well, and this is indicated by block 210. The axes of division of the segments (along the longitude line and the latitude line), define the grid segments in the relevant area.

Figure 4:
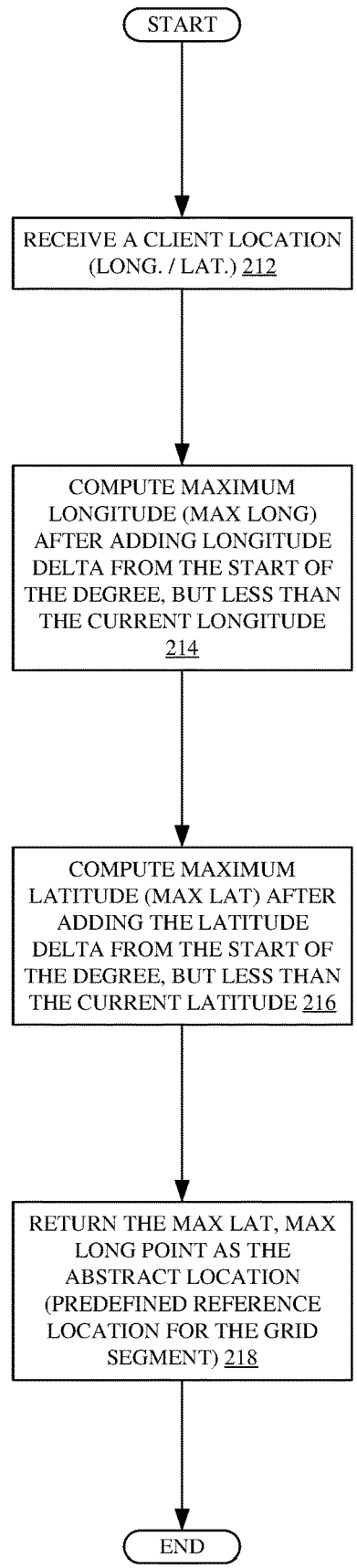
FIG. 4 is a flow diagram illustrating one example of the operation of the location abstraction system shown in FIG. 1 in returning an abstract location for a location input.

FIG. 4 is a flow diagram indicating how location abstraction system 126 identifies the particular grid segment and pre-defined reference location (or abstracted location) for a particular longitude and latitude that is received. It is first assumed that location abstraction system 126 receives the client location. This is indicated by block 212 in the flow diagram of FIG. 4. Location abstraction system 126 then computes the maximum longitude (max long) after adding increments of the longitude delta from the start of the longitude degree indicated by the client location (truncated to degrees), but less than the current untruncated longitude in the client location. Assuming that the pre-defined reference for a grid segment is the lower left-hand corner of that grid segment, then this computation finds the longitude coordinate corresponding to that corner. This is indicated by block 214 in the flow diagram of FIG. 4.

Next, location abstraction system 126 computes the maximum latitude (max lat) after adding increments of the latitude delta from the start of the latitude degree indicated by the client location (truncated to degrees), but less than the current untruncated latitude in the client location. This finds the latitude coordinate for the lower left-hand corner of the grid section that the client location resides in. This is indicated by block 216 in the flow diagram of FIG. 4.

Location abstraction system 126 then returns the max lat/max long point as the abstract location (or pre-defined reference location) for the grid segment that includes the received latitude and longitude coordinates in the client location. This is indicated by block 218 in the flow diagram of FIG. 4.

Table 1 shows another form of pseudo code for finding the lower left-hand corner of a grid segment, of 300 square meters, that includes a longitude and latitude coordinate (client location) that is input from a location sensing system 122.

TABLE 1

```
// Algorithm
// Compute the distance between two degree of variation for Long at input Lat angle
// Compute the delta in decimals to represent 300 meters distance between two long
degrees
// Divide the degree in multiple segments of 300 meters, to return the closest
segment start for the input long
// (similar for Lat variation from Long degree)
//End
function (lat, long) GetAbstractedLatLong(InputLat, InputLong)
{
// Extracting Degrees part of the input Lat Long, say lat= 45.89827, Degree is 45
latDegree = GetDegree(InputLat);
longDegree = GetDegree(InputLong);
latDecimal = GetDecimals(InputLat);
LongDecimal = GetDecimals(InputLong);
// Exception: We don't want to compute 300 meter block at or near the poles as
variation is very large and not significant customer base anticipated
if(latDegree > 87)
return;
// Distance between two Long Degrees at Lat 0 (Equator), is 111 Kms
// Distance between two Long Degrees at Lat L1, is 111 * COS(LatDegrees)
// Distance between two Lat Degrees does not vary with Long degree, a constant~
longVariation300M = 300/(111 * 1000 * COS(latDegree))
latVariation300M = 300/(136 * 1000)
// Compute number of 300 meters fit into a single Long Degree at the input Lat
angle (degree)
// Similarly for Lat Degree
// Extract the start of 300 meter block that input Long belongs to, say 0.7842/0.0022
longBlock = Floor(LongDecimal/longVariation300M)
latBlock = Floor(latDecimal/latVariation300M)
// Consider previous block if current block crosses the degree boundary
If (longBlock + 1 ) * longVariation300M > 1)
then longBlock = longBlock − 1
If (latBlock + 1 ) * latVariation300M > 1)
then latBlock = latBlock − 1
return (longDegree + longBlock * longVariation300M, latDegree + latBlock *
latVariation300M)
}
```

Figure 5:
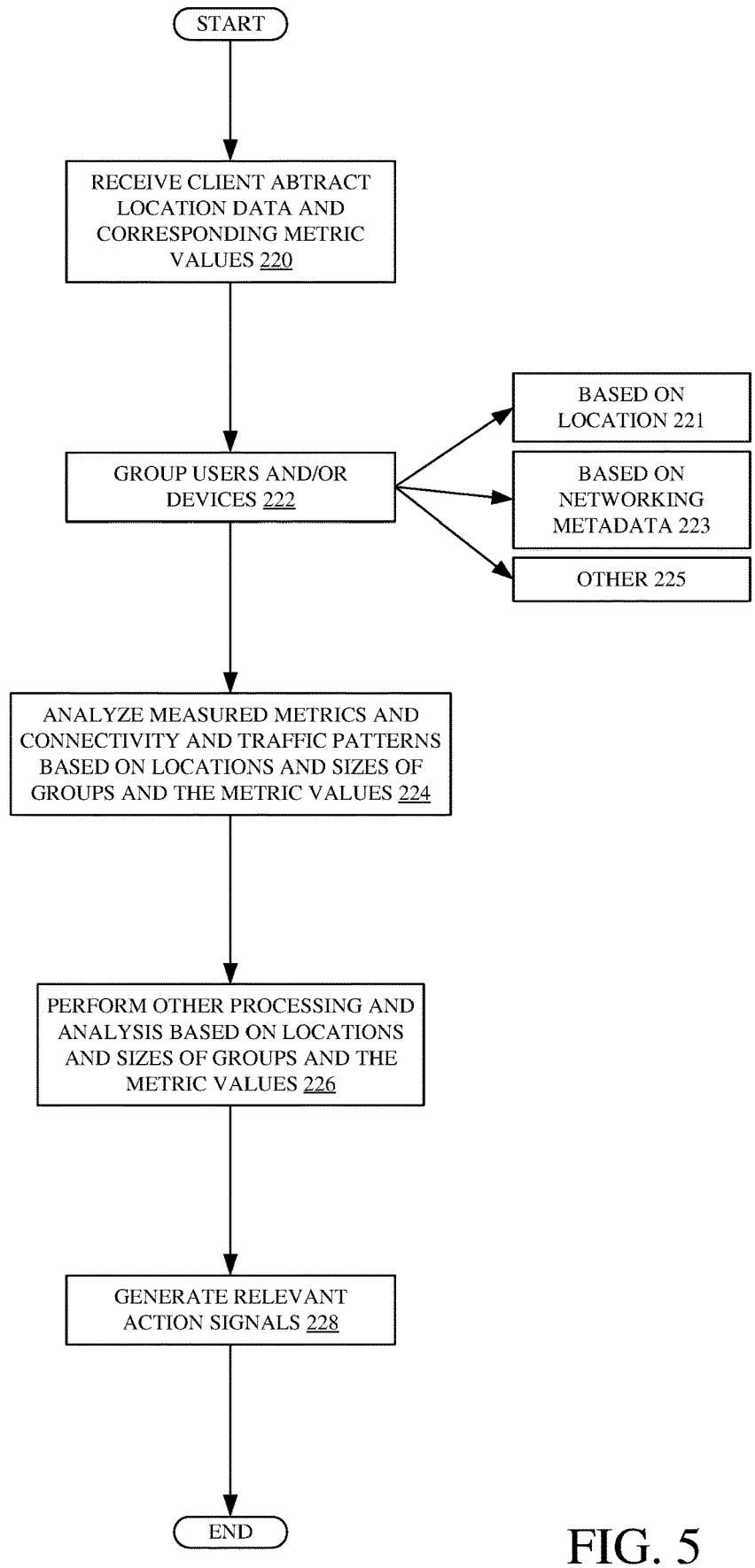
FIG. 5 is a flow diagram illustrating one example of how a cloud service computing system can use the abstract locations.

FIG. 5 is a flow diagram illustrating one example of the operation of a location data consuming application or service 136. It is first assumed that the client abstract location data and measured metric values are received by cloud service computing system 104, from client device/computing systems 102 and 112. This is indicated by block 220 in the flow diagram of FIG. 5. User grouping system 138 then groups users 110, 116. There can be a variety of different grouping criteria, such as based upon their geographic location, as indicated by the abstract location data corresponding to those users (and/or their corresponding client devices/computing systems 102, 112), based on networking metadata, and/or other criteria. Grouping the users and/or devices is indicated by block 222 in the flow diagram of FIG. 5. Grouping based on location is indicated by block 221, grouping based on networking metadata is indicated by block 223 and grouping based on other criteria is indicated by block 225.

Measured metric analysis system 139 then analyzes the measured metrics, and connectivity analysis system 140 analyzes connectivity and traffic patterns based on locations and sizes of the groups. This is indicated by block 224. For example, if a relatively large group of users or devices is frequently accessing a cloud services computing system 104, and they are all grouped in one geographic location, then the connectivity and traffic patterns for that geographic location can be high. Also, a pool of shared devices could result in a relatively large number of users, but not a large number of devices.

Location data consuming application/service 136 can perform other processing and analysis based upon the locations and sizes of groups, as indicted by the abstract location data. This is indicated by block 226. Location data consuming application/service 136 can then generate relevant action signals based on the analysis. This is indicated by block 228. The action signals can be, for instance, to change the routing of traffic when interacting with cloud service computing system 104, to deploy additional resources in different geographic locations to improve connectivity characteristics, to reduce computing resources in other locations, to surface an indication of the analyses that are performed for design, administrative or engineering personnel, or a wide variety of other relevant action signals.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
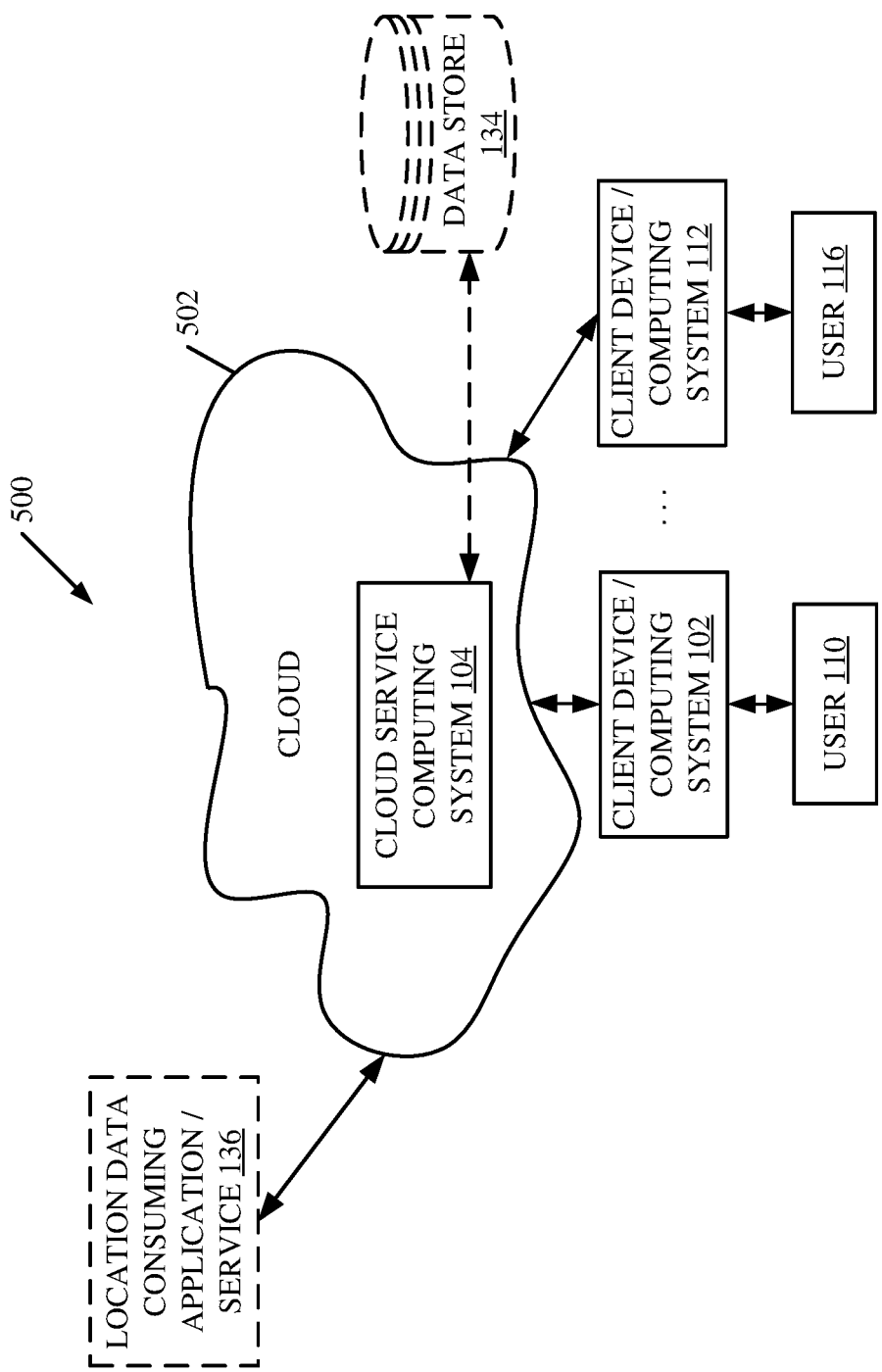
FIG. 6 is a block diagram showing the architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself, or by a third party, and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that remote server computing system 104 can be located in cloud 502 (which can be public, private, or a combination where portions are public while others are private). Therefore, users 110, 116 use user devices 102, 112 to access those systems through cloud 502.

FIG. 6 also depicts another example of a cloud architecture. FIG. 6 shows that it is also contemplated that some elements of computing system 104 can be disposed in cloud 502 while others are not. By way of example, data store 134 can be disposed outside of cloud 502, and accessed through cloud 502. In another example, location data consuming application/service 136 (or other items) can be outside of cloud 502. Regardless of where they are located, they can be accessed directly by device 102, 112, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
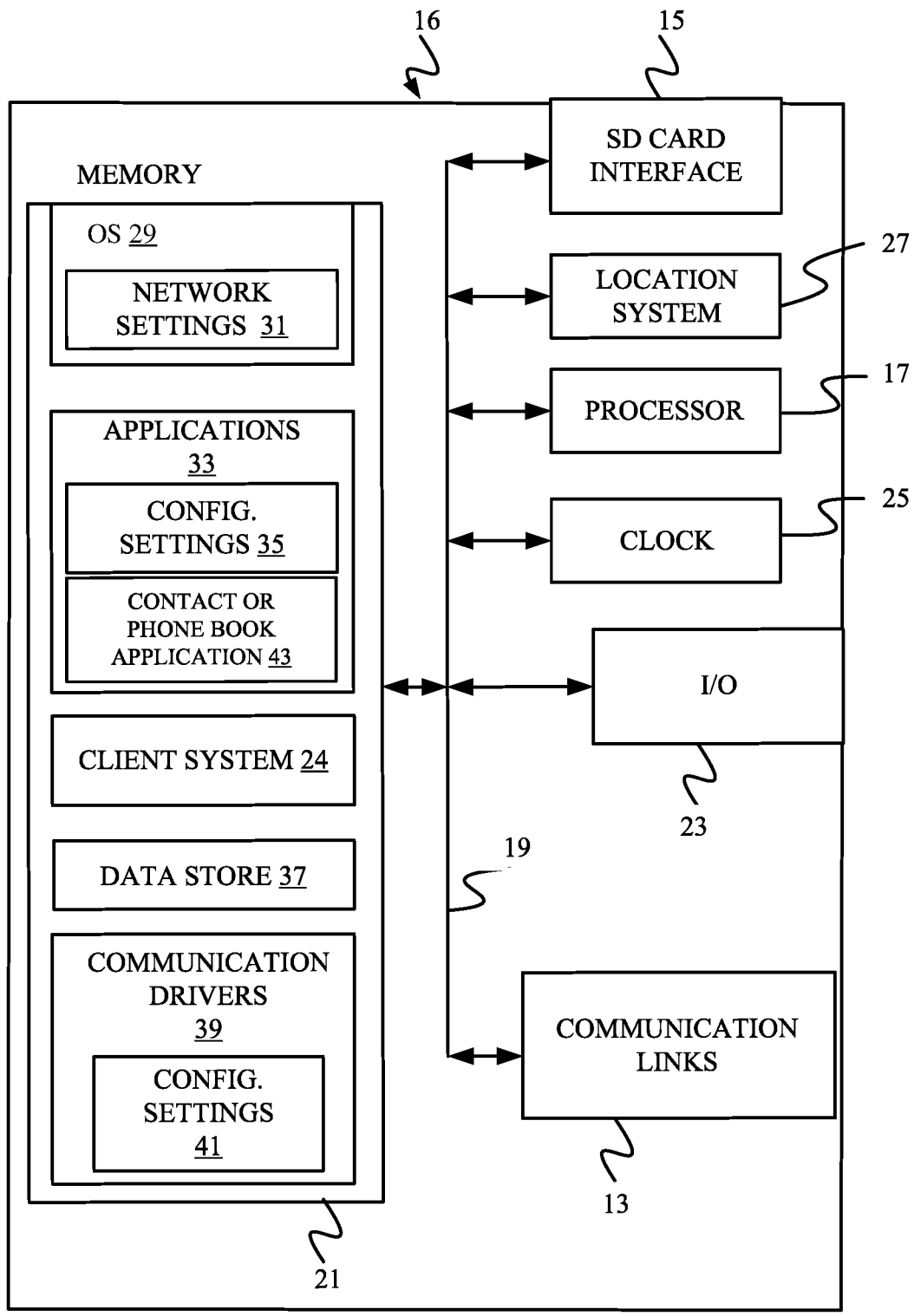
FIGS. 7-9 show examples of mobile devices that can be used in the architectures shown in the previous FIGS.
Figure 8:
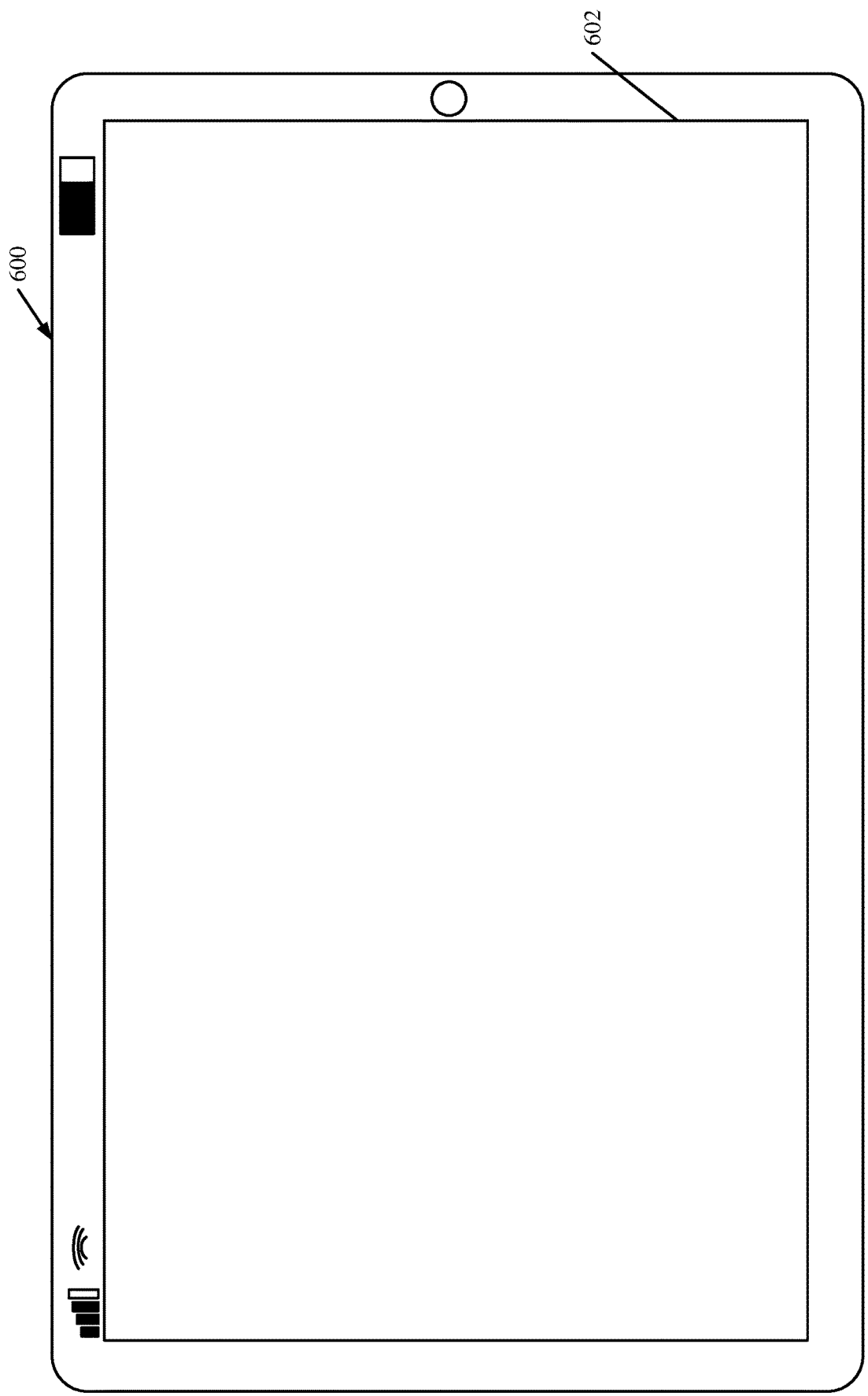
Figure 9:
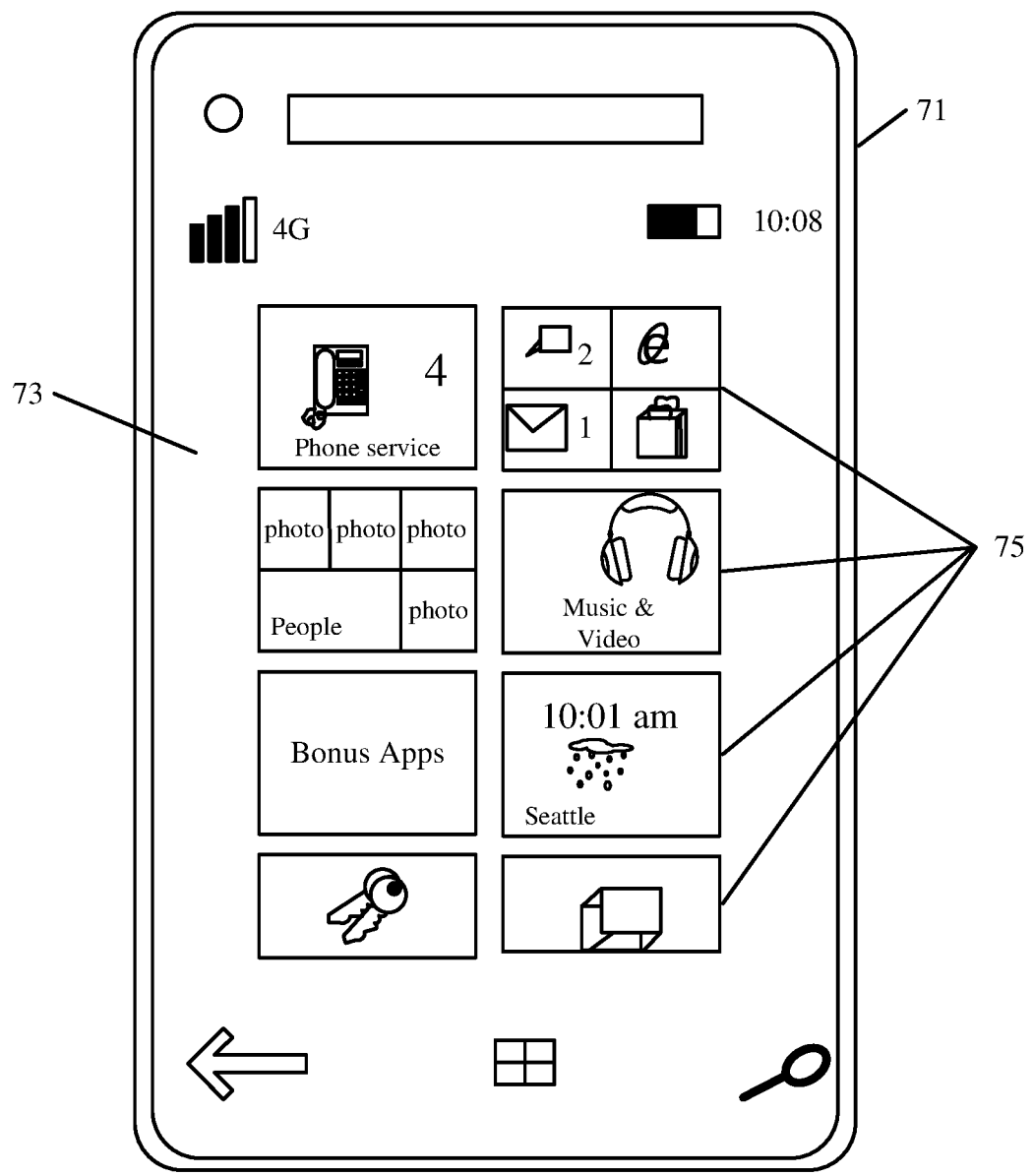

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components computing systems 102, 112 or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one example in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
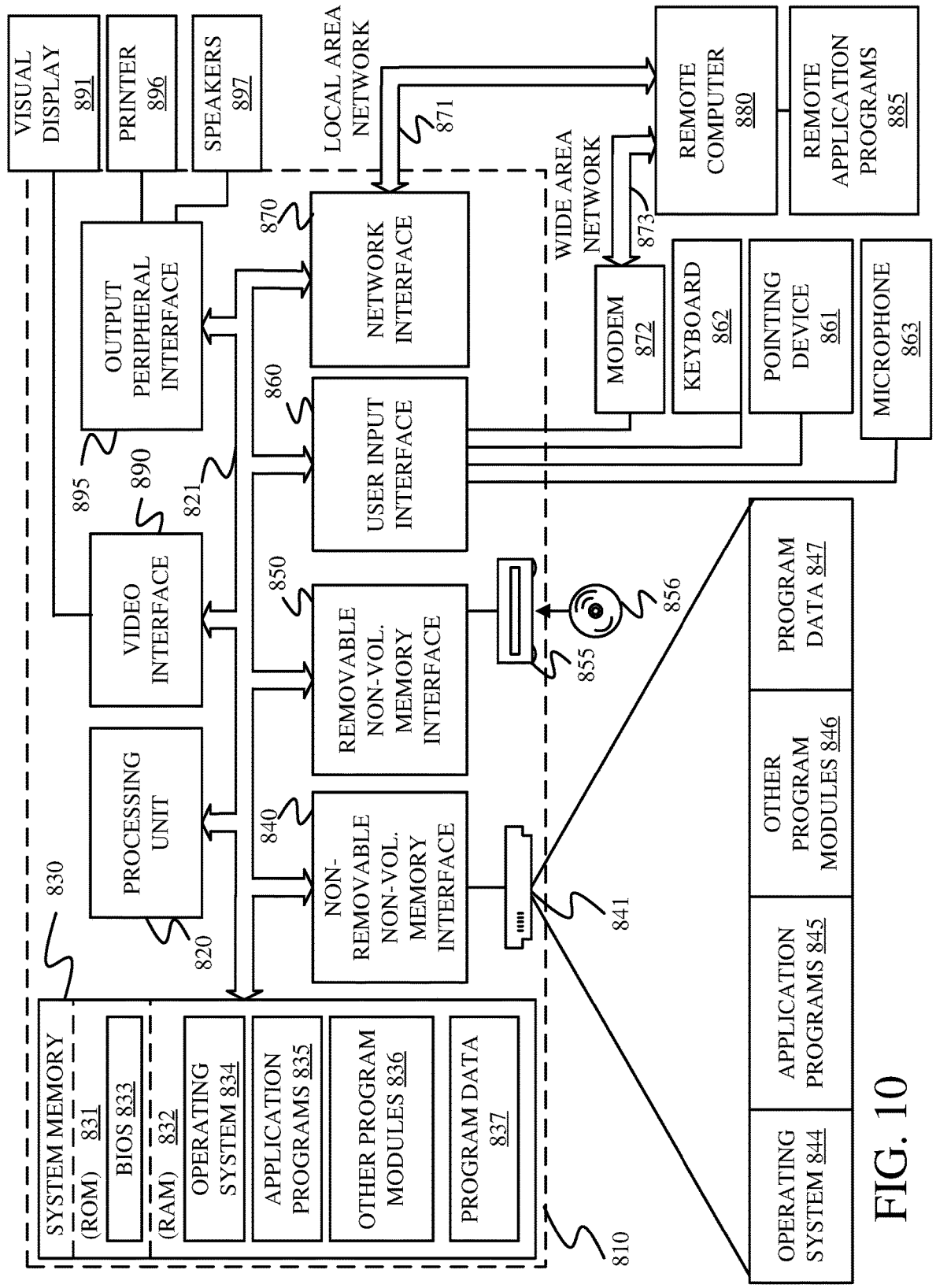
FIG. 10 is a block diagram showing one example of a computing environment that can be used in the architectures illustrated in the previous FIGS.

FIG. 10 is one example of a computing environment in which architecture 100, or parts of it, (for example) can be deployed. With reference to FIG. 10, an example system for implementing some embodiments includes a general-purpose computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer implemented method, comprising:
receiving a set of location coordinates indicative of a location of a client device;
identifying a pre-defined geographic grid section, having a predefined area, that includes the set of location coordinates;
identifying a pre-defined reference location corresponding to the identified predefined geographic grid section, as an abstract client location;
measuring a metric value, that varies based on location, corresponding to the abstract client location; and
sending the abstract client location and the corresponding metric value to a remote computing system.

Example 2 is the computer implemented method of any or all previous examples wherein identifying the pre-defined reference location comprises:
identifying corner coordinates corresponding to a corner of the identified predefined geographic grid section.

Example 3 is the computer implemented method of any or all previous examples wherein identifying the pre-defined reference location comprises:
identifying center coordinates corresponding to a center of the identified predefined geographic grid section.

Example 4 is the computer implemented method of any or all previous examples wherein receiving a set of location coordinates comprises:
receiving a client longitude coordinate and a client latitude coordinate.

Example 5 is the computer implemented method of any or all previous examples wherein the predefined area comprises a square having a pair of longitudinal sides and latitudinal sides, each of length x length units.

Example 6 is the computer implemented method of any or all previous examples wherein identifying the pre-defined reference location comprises:
identifying a longitude value of the corner coordinates by computing a maximum longitudinal value, that corresponds to the predefined reference location of one of the predefined geographic grid sections, that is less than the client longitude value Example 7 is the computer implemented method of any or all previous examples wherein identifying the pre-defined reference location comprises:
identifying a latitude value of the corner coordinates by computing a maximum latitude value, that corresponds to the predefined reference location of one of the predefined geographic grid sections, that is less than the client latitude value.

Example 8 is the computer implemented method of any or all previous examples wherein sending the abstract client location comprises:
sending the maximum latitude value and the maximum longitude value.

Example 9 is the computer implemented method of any or all previous examples wherein x length units comprises x meters and wherein the client longitude coordinate comprises client Long-D degrees and wherein the client latitude coordinate comprises client Lat-D degrees and wherein identifying a longitude value of the corner coordinates comprises:
identifying a longitude delta as x/111,000 m*cos (client Lat-D); and
adding increments of the longitude delta from a start of the client Long-D degree, truncated to full degrees, to obtain the maximum longitude value that is less than the client Long-D degrees.

Example 10 is the computer implemented method of any or all previous examples wherein identifying a latitude value of the corner coordinates comprises:
identifying a latitude delta as x/136000; and
adding increments of the latitude delta from a start of the client Lat-D degree, truncated to full degrees, to obtain the maximum latitude value.

Example 11 is a computer system, comprising:
a metric sensor that senses a value of a cloud service interaction variable that varies based on location;
a position sensor that senses a geographic location corresponding to the value of the cloud service interaction variable and generates a location signal indicative of the sensed geographic location;
one or more processors; and
memory that stores computable executable instructions which, when executed by the one or more processors cause the one or more processors to perform steps, comprising:
generating a set of location coordinates indicative of the sensed geographic location, based on the location signal;
identifying a pre-defined geographic grid section, having a predefined area, that includes the set of location coordinates;
identifying a pre-defined reference location corresponding to the identified predefined geographic grid section, as an abstract client location; and
sending the abstract client location and the corresponding value of the cloud service interaction variable to a remote computing system.

Example 12 is the computer system of any or all previous examples wherein identifying the pre-defined reference location comprises:
identifying corner coordinates corresponding to a corner of the identified predefined geographic grid section.

Example 13 is the computer system of any or all previous examples wherein identifying the pre-defined reference location comprises:
identifying center coordinates corresponding to a center of the identified predefined geographic grid section.

Example 14 is the computer system of any or all previous examples wherein receiving a set of location coordinates comprises:
receiving a client longitude coordinate and a client latitude coordinate.

Example 15 is the computer system of any or all previous examples wherein the predefined area comprises a square having a pair of longitudinal sides and latitudinal sides, each of length x length units.

Example 16 is the computer system of any or all previous examples wherein identifying the pre-defined reference location comprises:
identifying a longitude value of the corner coordinates by computing a maximum longitudinal value, that corresponds to the predefined reference location of one of the predefined geographic grid sections, that is less than the client longitude value Example 17 is the computer system of any or all previous examples wherein identifying the pre-defined reference location comprises:
identifying a latitude value of the corner coordinates by computing a maximum latitude value, that corresponds to the predefined reference location of one of the predefined geographic grid sections, that is less than the client latitude value.

Example 18 is the computer system of any or all previous examples wherein sending the abstract client location comprises:
sending the maximum latitude value and the maximum longitude value.

Example 19 is a computer system, comprising:
a metric measurement system that measures an interaction metric that varies based on a location where the interaction metric is measured;
a position sensor that senses a geographic location and generates a location signal indicative of the sensed geographic location;
one or more processors; and
memory that stores computable executable instructions which, when executed by the one or more processors cause the one or more processors to implement:
a location abstraction system configured to generate a set of location coordinates indicative of the sensed geographic location, based on the location signal, identify a pre-defined geographic grid section, having a predefined area, that includes the set of location coordinates, and identify a pre-defined reference location corresponding to the identified predefined geographic grid section, as an abstract client location corresponding to the interaction metric; and
a communication system that sends the abstract client location and the corresponding interaction metric to a remote computing system.

Example 20 is the computer system of any or all previous examples wherein the location abstraction system is configured to identifying the pre-defined reference location by identifying corner coordinates corresponding to a corner of the identified predefined geographic grid section.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
receiving a set of location coordinates indicative of a location of a client device;
identifying a pre-defined geographic grid section having a pre-defined area;
determining that the pre-defined geographic grid section includes the set of location coordinates;
identifying, as an abstract client location, a pre-defined reference location defined relative to the identified pre-defined geographic grid section;
generating, by the client device, an interaction metric corresponding to the abstract client location, wherein the interaction metric represents an interaction characteristic between the client device and a remote service, and the interaction characteristic varies based on a location of the client device where the interaction metric is measured; and
sending, by the client device, the abstract client location and the interaction metric to a remote computing system that is remote from the client device.

2. The computer implemented method of claim 1 wherein identifying the pre-defined reference location comprises at least one of:
identifying corner coordinates corresponding to a corner of the identified pre-defined geographic grid section; or
identifying center coordinates corresponding to a center of the identified predefined geographic grid section.

3. The computer implemented method of claim 1 wherein receiving a set of location coordinates comprises:
receiving a client longitude coordinate and a client latitude coordinate that correspond to the location of the client device, and
the predefined area comprises a square having a pair of longitudinal sides and latitudinal sides, each side of the pair of longitudinal sides and latitudinal sides having a length of x length units.

4. The computer implemented method of claim 2 wherein identifying the pre-defined reference location comprises:
identifying a longitude value of the corner coordinates by computing a maximum longitudinal value, that corresponds to a predefined reference location of one of a plurality of predefined geographic grid sections, that is less than the client longitude value.

5. The computer implemented method of claim 1, wherein the remote service comprises a cloud service computing system, the interaction metric comprises a cloud interaction metric, and
the computer-implemented method further comprises:
measuring a characteristic of communication between the client device and the cloud service computing system,
generating the cloud interaction metric to represent the measured characteristic of the communication between the client device and the cloud service computing system, and
sending the abstract client location and the cloud interaction metric to the cloud service computing system.

6. The computer implemented method of claim 1, wherein the remote computing system comprises an entry point to the remote service provided by the remote computing system, and
the interaction metric represents at least one of:
a throughput of a file download on the client device from the entry point, or
a simulated call experience on the client device from the entry point.

7. The computer implemented method of claim 4, wherein identifying the pre-defined reference location comprises:
identifying a latitude value of the corner coordinates by computing a maximum latitude value, that corresponds to the predefined reference location of one of the predefined geographic grid sections, that is less than the client latitude value, and
sending the abstract client location comprises:
sending the maximum latitude value and the maximum longitude value.

8. The computer implemented method of claim 4, wherein x length units comprise x meters,
the client longitude coordinate comprises client Long-D degrees,
the client latitude coordinate comprises client Lat-D degrees,
identifying a longitude value of the corner coordinates comprises:
identifying a longitude delta as x/111,000 m*cos (client Lat-D); and
adding increments of the longitude delta from a start of the client Long-D degree, truncated to full degrees, to obtain the maximum longitude value that is less than the client Long-D degrees; and
identifying a latitude value of the corner coordinates comprises:
identifying a latitude delta as x/136000; and
adding increments of the latitude delta from a start of the client Lat-D degree, truncated to full degrees, to obtain the maximum latitude value.

9. A computer system, comprising:
a metric sensor that senses a value of a cloud service interaction variable that varies based on location of the computer system where the cloud service interaction variable is measured and represents communication interactions between a cloud service and the computer system;
a position sensor that senses a geographic location corresponding to the value of the cloud service interaction variable, that varies based on location of the computer system, and generates a location signal indicative of the sensed geographic location;
one or more processors; and
memory that stores computable executable instructions which, when executed by the one or more processors cause the one or more processors to perform steps, comprising:
generating a set of location coordinates indicative of the sensed geographic location, based on the location signal;
identifying a pre-defined geographic grid section, having a predefined area, that includes the set of location coordinates;
identifying, as an abstract client location, a pre-defined reference location corresponding to the identified predefined geographic grid section; and
sending an indication of the abstract client location and the sensed value of the cloud service interaction variable from the computer system to a remote computing system that is remote from the computer system.

10. The computer system of claim 9 wherein identifying the pre-defined reference location comprises:
identifying corner coordinates corresponding to a corner of the identified predefined geographic grid section.

11. The computer system of claim 9 wherein identifying the pre-defined reference location comprises:
identifying center coordinates corresponding to a center of the identified predefined geographic grid section.

12. The computer system of claim 9 wherein receiving a set of location coordinates comprises:
receiving a client longitude coordinate and a client latitude coordinate that correspond to the location of the computer system.

13. The computer system of claim 10 wherein the predefined area comprises a square having a pair of longitudinal sides and latitudinal sides, each side of the pair of longitudinal sides and latitudinal sides having a length of x length units.

14. The computer system of claim 10 wherein
identifying the pre-defined reference location comprises:
identifying a longitude value of the corner coordinates by computing a maximum longitudinal value, that corresponds to a predefined reference location of one of the predefined geographic grid sections, that is less than the client longitude value; and
identifying a latitude value of the corner coordinates by computing a maximum latitude value, that corresponds to the predefined reference location of one of a plurality of predefined geographic grid sections, that is less than the client latitude; and
sending the abstract client location comprises:
sending the maximum latitude value and the maximum longitude value.

15. The computer system of claim 9 wherein
the computer system comprises a mobile client device, and
the cloud service interaction variable represents a latency encountered from the location of the mobile client device to a location of an entry point to a service provided by the cloud service.

16. A client computing device comprising:
a position sensor configured to sense a geographic location of the client computing device and generates a location signal indicative of the sensed geographic location;
one or more processors; and
memory that stores instructions executable by the one or more processors, wherein the instructions, when executed, cause the client computing device to:
measure an interaction metric that varies based on a location of the client computing device where the interaction metric is measured, the interaction metric representing interaction between the client computing device and a remote service that is remote from the client computing device;
generate a set of location coordinates indicative of the sensed geographic location, based on the location signal;
identify a pre-defined geographic grid section, having a predefined area, that includes the set of location coordinates;
identify a pre-defined reference location corresponding to the identified predefined geographic grid section, as an abstract client location corresponding to the interaction metric; and
send the abstract client location and the corresponding interaction metric to a remote computing system that is remote from the client computing device.

17. The client computing device of claim 16, wherein the remote service comprises a cloud service computing system, and the interaction metric comprises a cloud interaction metric that represents a characteristic of communication between the client computing device and the cloud service computing system.

18. The computer implemented method of claim 1, wherein
the remote computing system comprises an entry point to a service provided by the remote computing system, and
the interaction metric represents a connectivity latency encountered from the location of the client device to a location of the entry point.

* * * * *